June 23, 1959 — S. C. STONE — 2,892,138
VARIABLE CAPACITOR
Filed Feb. 7, 1957 — 3 Sheets-Sheet 3
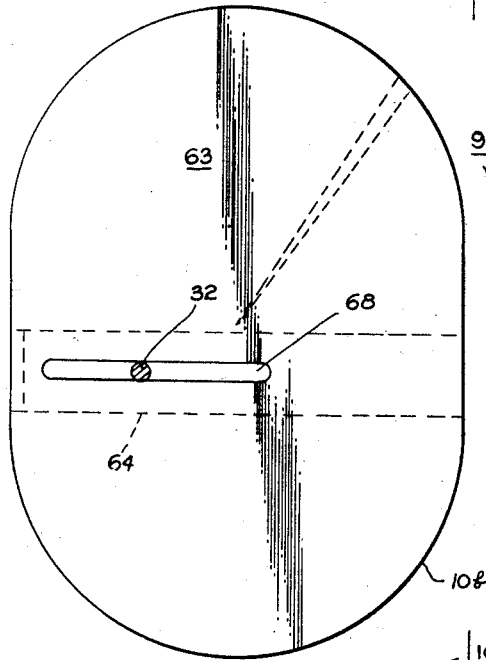
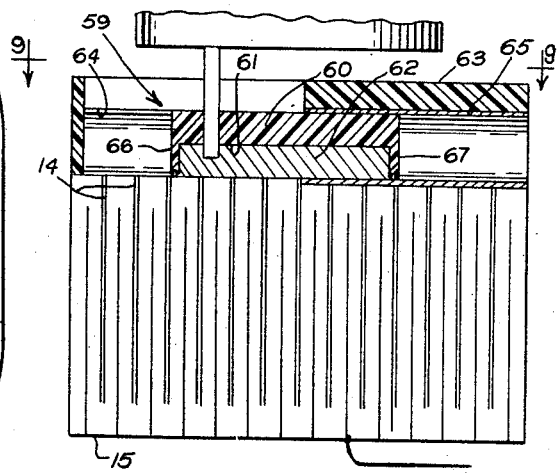
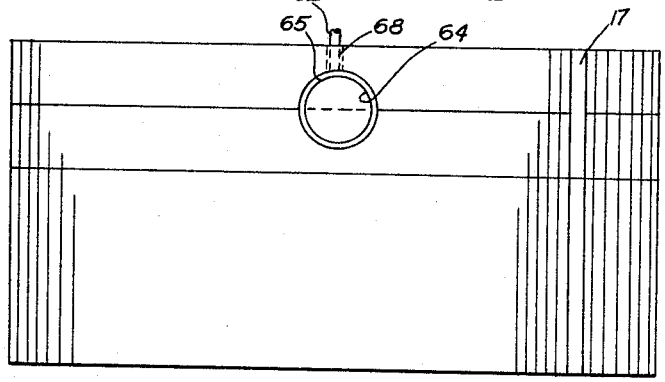
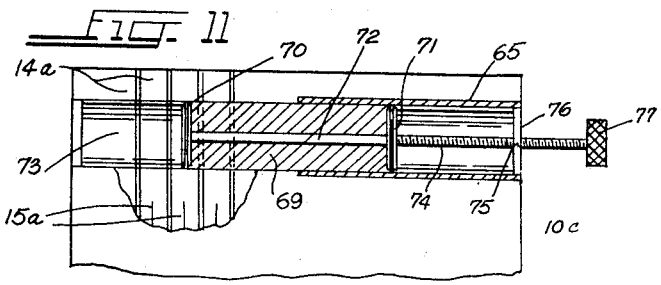
INVENTOR.
STANFORD C. STONE
BY Kegan and Kegan
Attys.

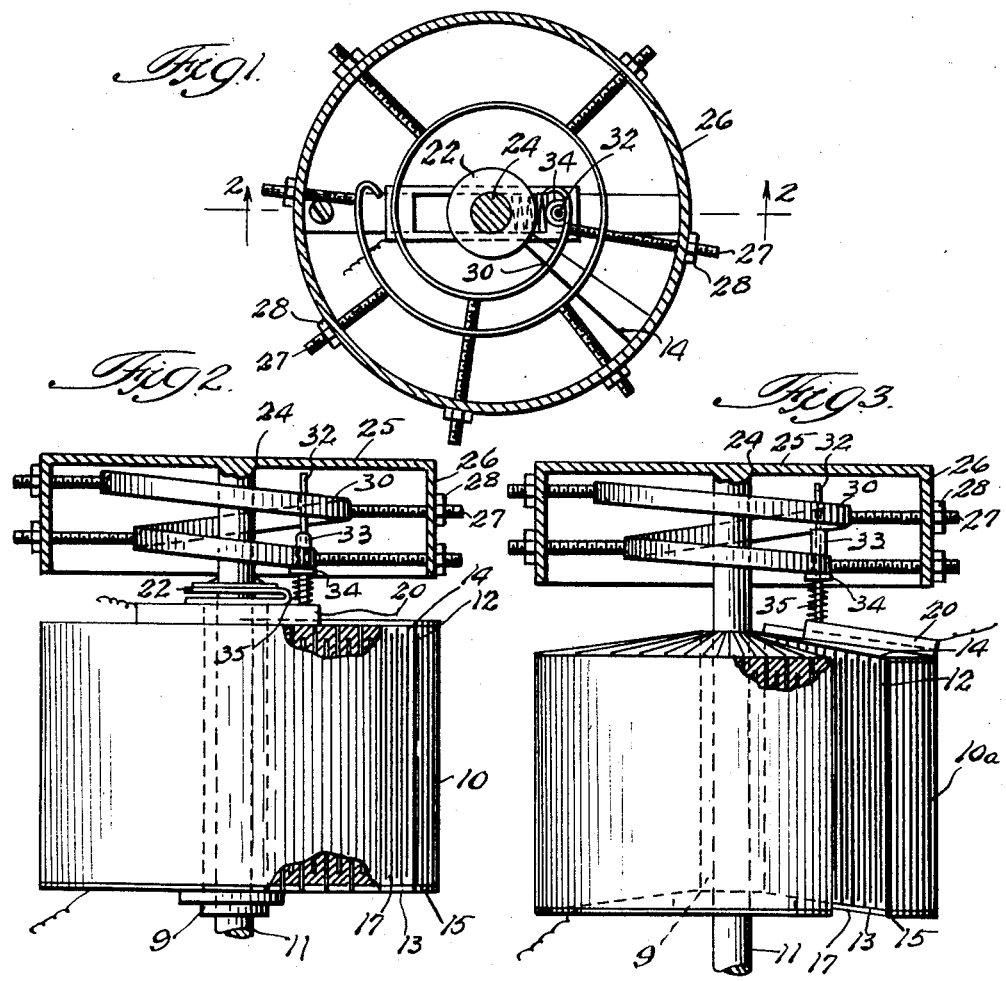

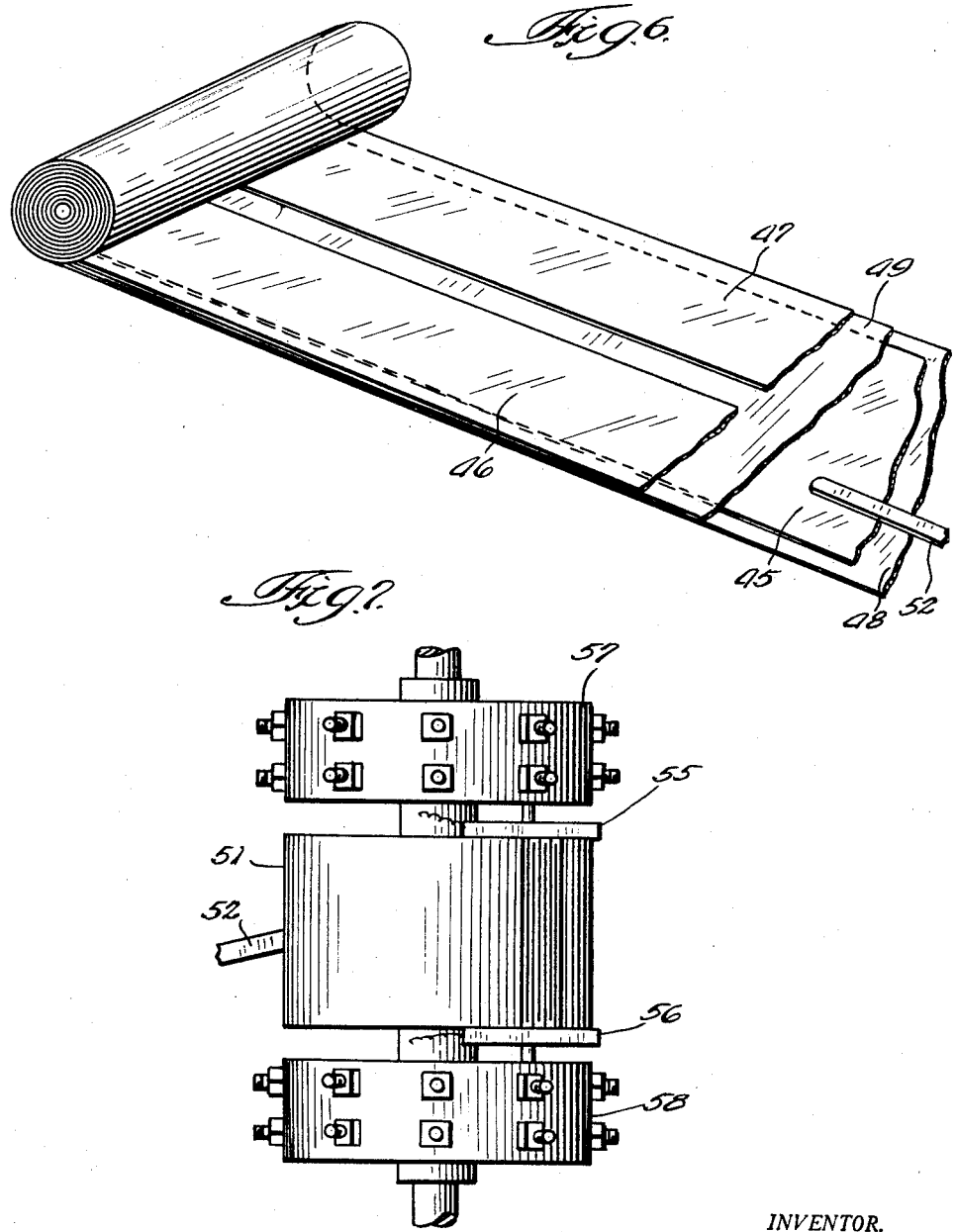

United States Patent Office 2,892,138
Patented June 23, 1959

2,892,138

VARIABLE CAPACITOR

Stanford C. Stone, Chicago, Ill.

Application February 7, 1957, Serial No. 638,894

11 Claims. (Cl. 317—249)

This invention relates to a variable capacitor, and more particularly to a variable capacitor having a high range of capacitance variation while utilizing comparatively small amount of space.

Variable capacitors consisting of relatively movable plates are well known and widely used. As a rule, the capacitance of such a device is relatively low in comparison to the volume taken by the device. While air is commonly used as a dielectric in such capacitors, liquid dielectrics having higher specific constants may be used and thus increase the total value of capacitance. Even then, a variable capacitor of reasonable dimensions will have a maximum capacitance of the order of micromicrofarads. A variable capacitor having relatively movable plates cannot be made in a size small enough to be useful where a total capacitance of the order of one microfarad is necessary.

It is, of course, possible to provide a number of fixed capacitors connected to suitable switching means to obtain a discontinuous variation of between predetermined maximum and minimum limits. In such case, the discrete capacitor values are usually substantial in terms of the total capacitor range so that capacitor variation necessarily occurs in rather large steps. However, there are many instances where a fine variation of capacitance between some small minimum value and a relatively large maximum value such as of the order of one or more microfarads may be desirable.

This application is a continuation-in-part of application Serial No. 544,852, filed November 4, 1955, now abandoned.

In addition to the desirability of having a fine variable capacitor with a large maximum capacitance, it is also desirable to provide accurate variations of capacitance at a predetermined ratio with respect to some parameter, such as for example, degree of rotation.

This invention provides a construction which combines the compactness of fixed capacitors with the generally smooth variability of variable capacitors. The invention in general contemplates a capacitor of the helically wound type, said capacitor being modified by opening the convolutions of the helix so that there results a large number of individual capacitor units. Means are provided for establishing an edge contact with any desired number of the individual capacitor plates so that the net result is a condenser whose capacitance may be varied in steps which are so small as to result in a substantially continuous capacitor variation. In one embodiment, the contact means includes a movable brush, while in another the contactor means comprises a pool of mercury confined within a non-conducting enclosure except along one face portion thereof which exposes the mercury to plates comprising one electrode of the capacitor.

In order that the invention may be fully understood, reference will now be made to the drawing wherein exemplary embodiments are shown, it being understood that variations may be made without departing from the scope of the invention except as defined by the appended claims. Referring therefore to the drawing:

Figure 1 is a top plan view of a construction embodying the present invention;

Figure 2 is a transverse sectional elevation along line 2—2 of Figure 1;

Figure 3 is a view generally similar to Figure 2 but showing a modified construction;

Figure 4 is a perspective view of a further modified form of capacitor unit forming part of the structure illustrated in Figures 1 and 2;

Figure 5 is a perspective view of a still further modified form of capacitor unit to be used in the construction illustrated in Figures 1 and 2;

Figure 6 illustrates a still further modified capacitor element partly unrolled;

Figure 7 illustrates a construction utilizing the still further modified capacitor element;

Figure 8 is a cross-sectional view showing a capacitor having a mercury pool contactor brush;

Figure 9 is a view taken along the line 9—9 in Figure 8;

Figure 10 is a view taken along the line 10—10 in Figure 9; and

Figure 11 is a fragmentary cross-sectional view of a further modification of a capacitor having a mercury pool contactor brush construction.

Referring first to Figures 1 and 2, the capacitor portion of the structure is indicated generally by 10 and comprises a generally cylindrical body similar to a conventional rolled capacitor. Thus capacitor 10 consists of metal foils 12 and 13 separated by suitable dielectric. Mandrel 11 of insulation is also provided. Capacitor 10 initially is constructed in conventional manner by rolling ribbons of metal foil separated by dielectric around an insulated tube 9, thereby forming the helical body. Mandrel 11 is then inserted into tube 9. Foil 12 is disposed so that edge 14 is accessible at one side of the condenser. Foil 13 is so disposed that edge 15 is accessible at the other end of capacitor 10.

In a conventional helical type capacitor, it is customary to bridge together the edges of the foils to form two terminals. Edges 14, for example, are customarily connected together to form one terminal and edges 15 are customarily connected together to form a second terminal. In order to use capacitor 10 in accordance with the present invention, it is important that at least edge 14 of foil 12 be short enough so that the edges of the adjacent turns will have no tendency to electrically connect to each other but may be maintained independent of each other.

To use the helically wound capacitor, in the present invention, it is necessary to excise a sector of the general cylinder shaped capacitor so that a series of separate electrical condenser plates are formed. Sector 17 may be cut to the mandrel surface and this sector may have any desired angular extent. It will be clear that by providing suitable means for contacting a predetermined number of edges 14 of what was formerly foil 12, any desired number of plates may be connected in parallel to form one part of a condenser. By having edges 15 electrically connected together, the pieces of foil formed of original strip 13 are now connected as the opposing plate of the condenser. It is, of course, possible to provide contact means for cooperating with edges 15 in a manner similar to edges 14.

It will be clear that there is provided a capacitor body having nesting interleaved plates arranged to form two groups of plates. The plates of one group alternate with the plates of the other group. The plates have their edges accessible at the ends of the capacitor body, one group having its edges accessible at one end and the other group having its edges accessible at the other end.

Referring to Figures 1 and 2, brush 20 of suitable material is adapted to slide across edges 14 of the capacitor. Brush 20 is long enough so that in one position it may form a connection between all of the edges 14 of the condenser so that all of such plates are connected together. Brush 20 may be of copper, bronze or other well known electrically conductive contact materials, and is smoothly finished to slide across edges 14 of the condenser plates. Edges 14 are preferably of a material like silver foil which will function as a good stationary contact material. The capacitor plates themselves may be of any suitable material. If original foil 12 is of material other than silver, then it may be advisable to provide an edging of silver or other suitable contact material to provide good conducting edges for cooperation with brush 20. Brush 20 will form one terminal of the capacitor, the other terminal being taken off edge 15 of foil 13.

In order to maintain brush 20 firmly in contact with the plate edges, flat spring 22 may be provided, this being anchored to mandrel 11 of the capacitor. Mandrel 11 has end 24 rotatively carrying head 25 of suitable material. Head 25 may be either of insulating or conducting material, as desired, and is provided with depending flange 26. Flange 26 has a number of bolts 27 secured thereto, the bolts passing through suitable apertures in the flange and being adjustably secured by nuts 28. Each bolt 27 is suitably attached to helical cam member 30.

As illustrated in Figures 1 and 2, cam member 30 is a spiral helix. By adjusting the radial position of each bolt 27 on flange 26, the shape of cam 30 may be varied within substantial limits. The radial position of brush 20 may be controlled by adjustable cam 30. Thus brush 20 carries pin 32 extending upwardly therefrom and disposed inside of cam 30. Riding on pin 32 is sleeve 33 having flange 34. Sleeve 33 is adapted to be disposed against the inside surface of cam 30 with flange 34 engaging the bottom edge of the cam. Spring 35 urges sleeve 33 upwardly to maintain flange 34 against the bottom edge of the cam.

Head 25 together with cam 30 is rotatable with respect to brush 20 and condenser 10. It is immaterial whether mandrel 11 rotates with the head or is stationary. However, a simple arrangement is to have mandrel 11 stationary and head 25 rotatable around the same. Brush 20 may be rotatably locked to mandrel 11 as by having the mandrel rectangular or non-circular at the region where the brush is located. It is also possible to provide radial guides carried by the end of the capacitor for preventing brush 20 from rotating with head 25. It will thus be clear that the rotational movement of mandrel 11 will be converted into a radial movement of brush 20 and that any desired correspondence between the amount of rotary movement of head 25 and radial movement of brush 20 may be secured. If desired, the portions of edges 14 of the capacitor plates which are beyond the range of brush travel (the left half of the top of the capacitor as seen in Figure 2) may be covered with a thin coating of insulation so that brush 20 will not function if part thereof travels beyond the center of the capacitor. Thus, as brush 20 is withdrawn from the contactable plate edges, it rides onto insulation.

Referring to Figure 3, a modification is illustrated wherein capacitor 10a has the top end thereof pitched. Pitching of the plate surfaces over which brush 20 is movable advantageously increases the area of contact between the brush and the plates, and further increases the surface electrical leakage path between plates of the same electrode. The brush mechanism may be generally similar to that illustrated in Figures 1 and 2.

It is also possible to control capacitor variation characteristics by controlling the shape of the cutout of the original spiral roll. Thus in Figures 1 to 3 inclusive, a simple pie-shaped portion was cut out to break the continuity of the metal foil. In Figure 4, however, the angular extent of the material cut out is varied along the length of the cylinder in which the capacitor lies. Thus cut out portion 17b tapers along the height of the condenser roll. Instead of having a straight taper as illustrated, the taper may be curved.

It is clear that the variation of capacitance per unit of rotation, such as degree of angle, may be made to differ in the modification illustrated in Figure 4 as compared to Figure 3 or Figure 2. In fact, in the modification illustrated in Figure 4, the variation of capacitance per degree of rotation will be different depending upon the position in the entire range of capacitance variation.

The radial extent of the brush may be controlled so that the brush may short-circuit only a predetermined portion of all of the variable plate edges. Thus for example, the brush may be long enough to engage only one-half of the number of plate edges. Hence in such case, the brush will start with the outer edge and build up capacitance until one-half of the edges are connected together. Thereafter, the brush when moving toward the center of the capacitor will simply add additional plates and discard plates at the outer end of the brush. Any desired ratio of brush length to total effective thickness of capacitor may be provided.

Referring now to Figure 5, a still different shape of capacitor cut-out may be provided to modify capacitance variation. In the illustration shown, cut-out 17c has a variable extent depending upon the radial distance from the axis of the capacitor, the cut-out being uniform along the axis of the capacitor. It is possible to combine the cut-outs of Figures 4 and 5 and provide for non-uniformity both radially of the capacitor axis as in Figure 5, and non-uniformity longitudinally of the capacitor axis as in Figure 4.

It is also possible to provide a dual capacitor arrangement utilizing the present invention. Referring to Figures 6 and 7, a dual capacitor may be made by having common foil electrode 45 cooperate with tandem twin foil electrodes 46 and 47. The common foil electrode is wide enough to cooperate with twin electrodes 46 and 47. It is understood that dielectric material such as paper 48 and 49 are used. The dual capacitor is fabricated by rolling to form a dual capacitor body 51. The common foil 45 will have terminal 52 at the outer end of the ribbon. To reduce the inductive effect of the common foil 45, it may be desirable to provide a short circuit between the common foil turns, such as by passing a screw through the common foil 45 at a point between the foils 46, 47. Twin foils 46 and 47 will have edges accessible at the ends of the capacitor body.

Brushes 55 and 56 will cooperate with the respective foil edges. Each brush, 55 or 56, will have its own mechanism for controlling the travel of the brush. Thus control means 57 may be used with brush 55 while control means 58 may be used with brush 56. It is not necessary that brushes 55 and 56 travel simultaneously. Thus control means 57 may be independent of control means 58 or both may be tied to work simultaneously.

Capacitor body 51 will have a sector portion cut out as in the previous forms of the invention. Thus the sector cut out may be similar to the ones cut out in Figures 2, 4 or 5. If desired, part of capacitor body 51 corresponding to, say, foil 46 may have a cut out similar to Figure 3 and the remainder of capacitor body 51 may have a cut out corresponding to Figure 4. The two parts of capacitor body 51 may be treated independently as far as cut outs are concerned. The two parts of capacitor body 51 may also be treated independently as far as the shape of the end of the body is concerned. Thus one or both ends of body 51 may be pitched as illustrated in Figure 3.

It will thus be manifest that a dual variable capacitor having substantial design and control possibilities is provided.

Referring to Figures 8–10, a modification is illustrated wherein the contact means, indicated generally at 59, includes a pool of mercury contained within a movable non-conducting enclosure. The mechanism for maintaining the modified brush structure firmly in contact with the plate edges and for controlling its position relative thereto may be generally similar to that illustrated in Figures 1 to 3, while the capacitance variation characteristics may be achieved by cut-out portions similar to those illustrated in Figures 3 to 5. The illustrated capacitor plates of Figures 8 to 10 are helically wound, as hereinbefore described, and the capacitor body 106 is flattened somewhat to provide plates which are generally perpendicular to the movable contact means, thus achieving better contact between the plates and the contact means and further increasing capacity yield for a given winding due to the plates being pressed closely together.

The modified contact means 59 includes a generally cylindrically shaped enclosure 60, preferably made from plastic or other known non-conducting materials, and having a cut-out portion 61 for holding a mercury pool 62 therein for exposure to the capacitor plate edges 14. The enclosure 60 is mounted in a non-conductive encapsulating top member 63, being axially movable therein through a passage 64. If desired, an insulating shield 65 may be provided around passage 64 along substantially half its extent so that the mercury pool will not function if part thereof travels beyond the capacitor center. In the illustration shown in Figure 6 the mercury pool brush travels over the edges 14 of the capacitor plates, while the ends 66, 67 of enclosure 60 act as pistons which confine the mercury within enclosure cut-out portion 61. A slot 68 is provided in top 63 to accommodate a pin 32 which extends therethrough and is connected at its lower end with enclosure 60. The upper end of pin 32 is connected to brush adjustment and retention mechanism similar to that described hereinabove.

Figure 11 illustrates a modification wherein the mercury brush pool 69 is confined between two pistons 70, 71, joined to a piston rod 72. The pistons 70, 71 are axially reciprocal in a cylindrical passage 73 provided in the cylindrical capacitor body 10c. The plates 15a end below passage 72 while the plates 14a illustrated in Figure 11 extend above the passage 72 which passes therethrough. Reciprocation of rod 71 in passage 72 brings the mercury brush pool 69 into contact with the various capacitor plates 14a at the junction of plates 14a with passage 72, there thus being provided greater mercury brush to plate contact area.

The mercury brush 69 of Figure 11 may be adjusted by mechanism similar to that previously described while the capacitance variations characteristics may be achieved by various shaped capacitor plates also as hereinbefore described. However, in Figure 11, the illustrated brush adjustment mechanism includes a threaded continuation portion 74 of rod 71 which threadably passes through an opening 75 in passage capping member 76. A knob 77 is provided to facilitate easy turning of the threaded rod to thus move the mercury pool 69 to achieve the desired capacitance. If desired, suitable markings may be provided in the threaded portion to denote capacitance for various positions of the mercury pool. Also, the capacitor may include a shield 65 which insulates the mercury brush pool from the capacitor plates over a portion of the brush travel in passage 73, while the pistons may be provided with suitable wiper gaskets to avoid a mercury trail in the passage.

The mercury contact brush provides a construction which assures a positive electrical connection across the plates. Wear of the plates is minimal since the resilient pool is not abrasive to the plates. Moreover, the mercury conforms to the shape of the plate edges to provide a better area of contact between the brush and the plates.

It is understood that the apparatus shown and described herein are preferred embodiments which have been given by way of example only, and that various changes and rearrangements of the details shown may be made without departing from the spirit of the invention, the scope of which is defined in the appended claims.

What is claimed is:

1. A variable capacitor, comprising: a generally cylindrical body including interleaved plates separated by a dielectric and forming concentric laminations extending parallel with the body axis, alternate plates being adapted to form one capacitor electrode, and the remaining plates being adapted to form the other capacitor electrode, the plates of one electrode having edges accessible at one end of said body, and the plates of the other electrode having edge portions accessible at the other end of said body, means electrically connecting the edge portions of the plates of said one electrode and forming one terminal of the capacitor, a positionable contactor disposed adjacent said other end of said body and engageable with the accessible edge portions thereat, said contactor having sufficient length to provide a connection across the edge portions of the plates comprising said other electrode, a manual control at said other end of said body and including an adjustable cam and means for operating said contactor from said manual control whereby a predetermined movement of said manual control results in a predetermined movement of said contactor along said other end of said body for connecting together a predetermined number of the plates comprising said other electrode, there being a sector portion cut out from said body extending from one end to the other of such body and of such configuration that the ratio in area, and consequently in capacity, which any last said plate other than the innermost one bears to the next inwardly adjacent one is brought to a desired predetermined value greater than unity.

2. The construction according to claim 1 wherein the cut-out portion of said capacitor body tapers axially of the capacitor body.

3. The construction according to claim 1 wherein said cut-out portion tapers radially of said capacitor body.

4. A variable capacitor, comprising: a body including interleaved plates separated by a dielectric and forming laminations extending parallel with the body axis, alternate plates being adapted to form one capacitor electrode, and the remaining plates being adapted to form the other capacitor electrode, the plates of one electrode having edges accessible at one end of said body, and the plates of the other electrode having edge portions accessible at the other end of said body, means electrically connecting the edge portions of the plates of said one electrode and forming one terminal of the capacitor, a positionable contactor disposed adjacent said other end of said body and engageable with the accessible edge portions thereat, said contactor having sufficient length to provide a connection across the edge portions of the plates comprising said other electrode, and including a non-conducting enclosure, a mercury pool contained within said enclosure and engageable with the edge portions of the plates forming said other electrode through an opening in the enclosure surface contiguous therewith, a sector portion cut out from said body, extending from one end thereof to the other end thereof, and of predetermined pattern whereby linear displacement of said contactor across said accessible edge portions varies the capacitance by a function related to the number and the shape of the plates engaged thereby, a manual control at said other end of said body and including an adjustable cam and means for operating said contactor from said manual control whereby a predetermined movement of said manual control results in a predetermined movement of said contactor along said other end of said body for connecting together a predetermined number of the plates comprising said other electrode.

5. A variable capacitor, comprising: a generally cylindrical body including interleaved plates separated by a dielectric, alternate plates being adapted to form one capacitor electrode, and the remaining plates being adapted to form the other capacitor electrode, means electrically connecting the plates of said one electrode and forming one terminal of the capacitor, the plates of the other electrode having edge portions accessible at one end of said body, a positionable contactor disposed adjacent said one end and engageable with the edge portions accessible thereat, said contactor having such length as to be engageable with only a predetermined portion of all edge portions, a manual control including an adjustable cam and means for operating said contactor from said control so that a predetermined movement of said control results in a predetermined movement of said contactor transversely of the body axis for connecting together the predetermined portion of said edge portions of the plates comprising said other electrode, there being a sector portion cut out from said body extending from one end to the other of such body and of such configuration that the ratio in area, and consequently in capacity, which any last said plates other than the innermost one bears to the next inwardly adjacent one is brought to a desired predetermined value greater than unity and which varies from pair to pair of adjacent ones of the last said plates.

6. A variable capacitor, comprising: a body including interleaved plates separated by a dielectric, alternate plates being adapted to form one capacitor electrode, and the remaining plates being adapted to form the other capacitor electrode, means electrically connecting the plates of said one electrode and forming one terminal of the capacitor, the plates of the other electrode having edge portions accessible at one end of said body, a positionable contactor disposed adjacent said one end and engageable with the edge portions accessible thereat, said contactor having such length as to be engageable with only a predetermined portion of all accessible edge portions, and including a non-conducting enclosure, a mercury pool contained therein and engageable with said accessible edge portions through an opening in the enclosure surface contiguous therewith, a sector portion cut out from said body, extending from said end thereof to the other end thereof, and tapering axially of the capacitor body, whereby linear displacement of said contactor along said accessible edge portions varies the capacitance by a predetermined function related to the shape of the plates contacted thereby, a manual control including an adjustable cam and means for operating said contactor from said control so that a predetermined movement of said control results in a predetermined movement of said contactor transversely of the body axis for connecting together the predetermined portion of said edge portions of the plates comprising said other electrode.

7. A variable capacitor, comprising: a body including interleaved plates separated by a dielectric and forming laminations extending parallel with the body axis, alternate plates being adapted to form one capacitor electrode, and the remaining plates being adapted to form the other capacitor electrode, means electrically connecting the plates of said one electrode and forming one capacitor terminal, the plates of said other electrode each having an additional portion extending beyond the plates of said one electrode, a positionable contactor engageable with the plate additional portions, and comprising a mercury pool, a movable member confining said mercury pool and provided with contact means contiguous with said plate additional portions whereat said mercury pool may make connections thereacross, means for moving said contactor, and a sector cut from said body, extending from one end to the other end thereof and of predetermined pattern whereby linear displacement of said contactor across said plate additional portions varies the capacitance by a predetermined function.

8. A variable capacitor comprising a layer wound capacitor body having opposed ends and having an end-to-end sector cut therefrom to provide a first, a second, and a third group of nesting interleaved conductive plates separated by dielectric and forming successive concentric laminations extending parallel with the body axis, the plates of the first and second groups having the edges thereof accessible at respective ends of said capacitor body for connection together to comprise first and second capacitor terminals, the plates of the third group being electrically connected together to comprise a third capacitor terminal, radially elongated contactors disposed respectively at the ends of said capacitor body in operative connecting relationship with the said accessible edges, and means for operating each contactor back and forth generally radially of the capacitor body to engage the edge of a variable number of its associated capacitor plates to thereby vary the capacity between the associated one of the said first and second capacitor terminals with respect to either of the other two of the three said capacitor terminals.

9. A variable capacitor, comprising: a body including interleaved plates separated by a dielectric and forming concentric laminations extending parallel with the body axis, alternate plates being adapted to form one capacitor electrode, and the remaining plates being adapted to form the other capacitor electrode, the plates of one electrode having edges accessible at one end of said body, and the plates of the other electrode having edge portions accessible at the other end of said body, means electrically connecting the edge portions of the plates of said one electrode and forming one terminal of the capacitor, a positionable contactor disposed adjacent said other end of said body and engageable with the accessible edge portions thereat, said contactor having sufficient length radially of the body to provide a connection across the edge portions of the plates comprising said other electrode, said body having a cut-out sector portion extending from one end thereof to the other end thereof, and of predetermined pattern which causes the plates to progress correspondingly in size, whereby linear displacement of said contactor across said accessible edge portions varies the capacitance by a function related to said pattern, a manual control at said other end of said body and including an adjustable cam and means for operating said contactor from said manual control whereby a predetermined movement of said manual control results in a predetermined movement of said contactor along said other end of said body for connecting together a predetermined number of the plates comprising said other electrode.

10. A variable capacitor, comprising: a body including interleaved concentric plates separated by a dielectric, alternate plates being adapted to form one capacitor electrode, and the remaining plates being adapted to form the other capacitor electrode, means electrically connecting the plates of said one electrode and forming one terminal of the capacitor, the plates of the other electrode having edge portions accessible at one end of said body, a positionable contactor disposed adjacent said one end and engageable with the edge portions accessible thereat, said contactor having such length radially of the body as to be engageable with only a predetermined portion of all accessible edge portions, said body having a cut-out sector portion extending from said end thereof to the other end thereof, and tapering axially of the capacitor body to cause the plates to progress correspondingly in size, whereby linear displacement of said contactor across said accessible edge portions varies the capacitance by a predetermined function related to the relative sizes of the plates contacted thereby, a manual control including an adjustable cam and means for operating said contactor from said control so that a predetermined movement of said control results in a predetermined movement of said contactor transversely of the body axis for connecting together the predetermined portion of said edge portions of the plates comprising said other electrode.

11. A variable capacitor, comprising: a layer wound capacitor body having opposed ends and having an endto-end sector cut therefrom to provide interleaved plates separated by a dielectric and comprising laminations extending parallel with the body axis, alternate plates being adapted to form one capacitor electrode, and the remaining plates being adapted to form the other capacitor electrode, means electrically connecting the plates of said one electrode and forming one capacitor terminal, the plates of said other electrode each having an additional portion extending beyond the plates of said one electrode, a positionable contractor engageable with the plate additional portions, and means for moving said contactor to engage a desired number of the last said portions.

References Cited in the file of this patent

UNITED STATES PATENTS

| | | | |
|---|---|---|---|
| 926,934 | De Forest | July 6, | 1909 |
| 1,508,647 | Cornelius | Sept. 16, | 1924 |
| 1,636,503 | Dorsey | July 19, | 1927 |
| 2,362,470 | De Rosa | Nov. 14, | 1944 |
| 2,789,259 | Eisler | Apr. 16, | 1957 |

FOREIGN PATENTS

| | | | |
|---|---|---|---|
| 390,809 | Germany | Feb. 23, | 1924 |
| 624,457 | Germany | Jan. 21, | 1936 |

UNITED STATES PATENT OFFICE

CERTIFICATE OF CORRECTION

Patent No. 2,892,138 June 23, 1959

Stanford C. Stone

It is hereby certified that error appears in the printed specification of the above numbered patent requiring correction and that the said Letters Patent should read as corrected below.

Column 9, line 10, for "contractor" read -- contactor --.

Signed and sealed this 1st day of September 1959.

(SEAL)
Attest:
KARL H. AXLINE
Attesting Officer

ROBERT C. WATSON
Commissioner of Patents